United States Patent
Boone et al.

(10) Patent No.: US 10,005,267 B1
(45) Date of Patent: Jun. 26, 2018

(54) FORMATION OF COMPLEX COMPOSITE STRUCTURES USING LAMINATE TEMPLATES

(71) Applicant: Textron Innovations Inc., Providence, RI (US)

(72) Inventors: Richard Boone, Wichita, KS (US); Benjamin de Putter, Maize, KS (US)

(73) Assignee: Textron Innovations, Inc., Providence, RI (US)

( * ) Notice: Subject to any disclaimer, the term of this patent is extended or adjusted under 35 U.S.C. 154(b) by 427 days.

(21) Appl. No.: 14/861,641

(22) Filed: Sep. 22, 2015

(51) Int. Cl.
*B64C 1/06* (2006.01)
*B32B 37/14* (2006.01)
*B64C 3/18* (2006.01)

(52) U.S. Cl.
CPC ........ *B32B 37/14* (2013.01); *B32B 2305/076* (2013.01); *B32B 2305/72* (2013.01); *B32B 2305/74* (2013.01); *B32B 2309/105* (2013.01); *B32B 2605/18* (2013.01); *B64C 1/06* (2013.01); *B64C 1/064* (2013.01); *B64C 1/065* (2013.01); *B64C 3/18* (2013.01); *B64C 3/182* (2013.01); *B64C 3/185* (2013.01); *B64C 3/187* (2013.01)

(58) Field of Classification Search
CPC . B32B 2605/18; B32B 2305/076; B64C 1/06; B64C 1/064; B64C 1/065; B64C 3/18; B64C 3/182; B64C 3/185; B64C 3/187; Y10T 156/1002
USPC ........................................... 156/307.1, 307.7
See application file for complete search history.

(56) References Cited

U.S. PATENT DOCUMENTS

| | | |
|---|---|---|
| 3,768,760 A | 10/1973 | Jensen |
| 4,268,561 A | 5/1981 | Thompson et al. |
| 4,385,949 A | 5/1983 | Fontes |
| 4,622,254 A | 11/1986 | Nishimura et al. |
| 4,740,540 A | 4/1988 | Kameda et al. |
| 4,770,929 A | 9/1988 | Nobumasa et al. |
| 4,833,029 A | 5/1989 | DuPont et al. |
| 4,883,700 A | 11/1989 | Harpell et al. |
| 5,055,242 A | 10/1991 | Vane et al. |
| 5,100,713 A | 3/1992 | Homma et al. |
| 5,123,985 A | 6/1992 | Evans et al. |
| 5,223,067 A | 6/1993 | Hamamoto et al. |
| 5,242,523 A | 9/1993 | Willden et al. |
| 5,338,497 A | 8/1994 | Murray et al. |

(Continued)

OTHER PUBLICATIONS

Weaver et al., The effect of flexural/twist anisotropy on compression buckling of quasi-isotropic laminated cylindrical shells, Composites Structures, vol. 55 (2002), pp. 195-204.

(Continued)

*Primary Examiner* — Carson Gross
(74) *Attorney, Agent, or Firm* — Erise IP, P.A.

(57) ABSTRACT

Embodiments of a method to fabricate complex structures include making a pre-cured laminate template. The laminate template is first cured to the required shape, then surface prepared for joining to additional composite lamina. The laminate templates are used to position composite lamina in contact with one another. The composite lamina are then co-cured together to form one monolithic composite structure lacking bond lines or bonded joints. The laminate template supports additional composite lamina for formation of complex structures and replaces template tools from conventional methods.

10 Claims, 10 Drawing Sheets

(56) References Cited

U.S. PATENT DOCUMENTS

| | | | |
|---|---|---|---|
| 5,368,807 A | 11/1994 | Lindsay | |
| 5,445,693 A | 8/1995 | Vane | |
| 5,448,505 A | 9/1995 | Novak | |
| 5,562,796 A | 10/1996 | Ertel | |
| 5,604,010 A | 2/1997 | Hartz et al. | |
| 5,624,519 A | 4/1997 | Nelson et al. | |
| 5,707,576 A | 1/1998 | Asher | |
| 5,855,709 A | 1/1999 | Bocoviz et al. | |
| 5,954,898 A | 9/1999 | McKague et al. | |
| 6,128,998 A | 10/2000 | Freitas et al. | |
| 6,458,309 B1 | 10/2002 | Allen et al. | |
| 6,589,472 B1 | 7/2003 | Benson | |
| 6,599,610 B2 | 7/2003 | Homma et al. | |
| 6,613,258 B1 | 9/2003 | Maison et al. | |
| 6,632,502 B1 | 10/2003 | Allen et al. | |
| 6,743,504 B1 * | 6/2004 | Allen | B29C 70/446 428/362 |
| 6,866,738 B2 | 3/2005 | Sato | |
| 7,410,352 B2 | 8/2008 | Sarh | |
| 7,790,637 B2 | 9/2010 | DiFonzo et al. | |
| 7,943,076 B1 | 5/2011 | Hawkins et al. | |
| 7,993,479 B2 | 8/2011 | Sander et al. | |
| 8,057,617 B2 | 11/2011 | Fujimoto | |
| 8,182,640 B1 | 5/2012 | Boone et al. | |
| 8,192,574 B1 | 6/2012 | Boone | |
| 8,197,625 B2 | 6/2012 | Garate Fel et al. | |
| 8,307,872 B2 | 11/2012 | Kendall et al. | |
| 8,556,213 B2 | 10/2013 | Markowski et al. | |
| 2002/0006523 A1 | 1/2002 | Obeshaw | |
| 2002/0071920 A1 | 6/2002 | Obeshaw | |
| 2003/0082385 A1 | 5/2003 | Li et al. | |
| 2003/0168555 A1 | 9/2003 | Livi et al. | |
| 2003/0175520 A1 | 9/2003 | Grutta et al. | |
| 2003/0198775 A1 | 10/2003 | Roth et al. | |
| 2004/0115299 A1 | 6/2004 | Potter et al. | |
| 2004/0134593 A1 | 7/2004 | Ishibashi et al. | |
| 2004/0175555 A1 | 9/2004 | Ogisu | |
| 2004/0222537 A1 | 11/2004 | Sidhu et al. | |
| 2005/0183808 A1 | 8/2005 | Barguet et al. | |
| 2005/0183818 A1 | 8/2005 | Zenkner et al. | |
| 2006/0006599 A1 | 1/2006 | Shahidi | |
| 2006/0049552 A1 | 3/2006 | Fish | |
| 2006/0216480 A1 | 9/2006 | Weidmann et al. | |
| 2006/0222837 A1 | 10/2006 | Kismarton | |
| 2006/0249868 A1 | 11/2006 | Brown et al. | |
| 2006/0254710 A1 | 11/2006 | Jung | |
| 2007/0102839 A1 | 5/2007 | McGowan et al. | |
| 2007/0161483 A1 | 7/2007 | Raf | |
| 2007/0176327 A1 * | 8/2007 | Petersson | B29C 70/342 264/319 |
| 2007/0236354 A1 | 10/2007 | Green | |
| 2008/0048359 A1 | 2/2008 | Krogager et al. | |
| 2008/0083494 A1 | 4/2008 | Sander et al. | |
| 2008/0099131 A1 | 5/2008 | Umeda et al. | |
| 2008/0111024 A1 | 5/2008 | Lee et al. | |
| 2008/0265093 A1 | 10/2008 | Munoz Lopez et al. | |
| 2008/0289743 A1 | 11/2008 | Tsotsis | |
| 2008/0311326 A1 | 12/2008 | Fujimoto | |
| 2009/0020645 A1 | 1/2009 | Cacciaguerra | |
| 2009/0074905 A1 | 3/2009 | Matsen et al. | |
| 2009/0120562 A1 | 5/2009 | Tsotsis et al. | |
| 2009/0233044 A1 | 9/2009 | Sun et al. | |
| 2009/0261199 A1 | 10/2009 | McCarville et al. | |
| 2009/0263618 A1 | 10/2009 | McCarville et al. | |
| 2009/0283638 A1 | 11/2009 | Arevalo Rodriguez et al. | |
| 2009/0320398 A1 | 12/2009 | Gouvea | |
| 2010/0086727 A1 | 4/2010 | Katayama et al. | |
| 2010/0098910 A1 | 4/2010 | Naritomi et al. | |
| 2010/0124659 A1 | 5/2010 | Nelson et al. | |
| 2010/0136293 A1 | 6/2010 | Kubryk et al. | |
| 2010/0159189 A1 | 6/2010 | Takagi et al. | |
| 2010/0233424 A1 | 9/2010 | Dan-Jumbo et al. | |
| 2010/0285265 A1 | 11/2010 | Shinoda et al. | |
| 2011/0045232 A1 | 2/2011 | Kismarton | |
| 2011/0064908 A1 | 3/2011 | Kweder | |
| 2011/0097554 A1 | 4/2011 | Kehrl et al. | |
| 2012/0308766 A1 | 12/2012 | Kweder | |
| 2013/0034684 A1 | 2/2013 | Meyer et al. | |
| 2013/0327472 A1 | 12/2013 | De Mattia | |
| 2013/0330503 A1 | 12/2013 | Kismarton | |
| 2013/0344291 A1 * | 12/2013 | Pearson | B29C 70/865 428/157 |
| 2014/0170371 A1 | 6/2014 | Kamiya et al. | |
| 2014/0186588 A1 * | 7/2014 | Victorazzo | B64C 1/064 428/178 |

OTHER PUBLICATIONS

Office Action issued in Related U.S. Appl. No. 12/829,234 dated Jan. 3, 2011, 10 pages.
Response to Office Action issued in Related U.S. Appl. No. 12/829,234 dated Mar. 18, 2011, 10 pages.
Office Action issued in Related U.S. Appl. No. 12/829,234 dated Mar. 31, 2011, 13 pages.
Office Action dated Aug. 1, 2011 in related U.S. Appl. No. 12/779,706, 18 pages.
Notice of Allowance issued in related U.S. Appl. No. 12/779,706, dated Jan. 26, 2012, 9 pages.
Notice of Allowance issued in related U.S. Appl. No. 12/829,234, dated Jan. 19, 2012, 15 pages.
Daniel, Isaac M. Ishai, Ori, Engineering Mechanics of Composite Materials (2nd edition), 2006 Oxford University Press.
U.S. Appl. No. 13/763,543 Office Action dated Dec. 3, 2014, 14 pages.
U.S. Appl. No. 13/763,427 select file history dated Sep. 22, 2014 to Feb. 17, 2015, 23 pages.
U.S. Appl. No. 13/763,416 OA dated Oct. 22, 2014, 9 pages.

* cited by examiner

FORMATION OF COMPLEX COMPOSITE STRUCTURES USING LAMINATE TEMPLATES

BACKGROUND

Embodiments of this disclosure relate generally to fabricating composite structures, and more specifically to manufacturing composite structures for aircraft.

SUMMARY

According to one embodiment, a method to fabricate a composite structure is provided. The method includes providing a laminate template including a first template surface having a bend, providing a first prepreg layup including first and second opposing surfaces, and securing at least a portion of the first surface of the first prepreg layup to the first template surface including the bend to form a laminate template-prepreg, where the portion of the first prepreg layup secured to the laminate template substantially adopts the shape of the first template surface. The method further includes providing a tool having a second template surface, providing a second prepreg layup including first and second opposing surfaces, and placing at least a portion of the first surface of the second prepreg layup in contact with the second template surface of the tool such that the second prepreg layup substantially adopts the shape of the second template surface of the tool. The method further includes positioning the laminate template-prepreg with respect to the second prepreg layup, where the at least a portion of the second surface of the first prepreg layup contacts the second surface of the second prepreg layup. The method additionally includes co-curing the laminate template-prepreg and the second prepreg layup together after the positioning of the laminate template-prepreg to form a composite structure.

According to one embodiment, the method to fabricate a composite structure includes the bend of the laminate template possessing an internal radius of curvature less than 0.25 inch.

According to one embodiment, the method to fabricate a composite structure includes the thickness of the laminate template being about one third of the laminate template-prepreg thickness.

According to one embodiment, the method to fabricate a composite structure includes securing the first surface of the first prepreg layup to the first surface of the laminate template, which further includes partially curing the first prepreg layup with the laminate template.

According to one embodiment, the method to fabricate a composite structure includes the portion of the second surface of the first prepreg layup contacting the second prepreg layup, which includes the bend.

According to one embodiment, the method to fabricate a composite structure includes the portion of the second surface of the first prepreg layup contacting the second prepreg layup, which does not include the bend.

According to one embodiment, the method to fabricate a composite structure includes the portion of the first prepreg layup including the bend being offset from the second prepreg layup to define a cavity therebetween.

According to one embodiment, the method to fabricate a composite structure includes co-curing together the laminate template-prepreg with the second prepreg layup, while the second prepreg layup remains in contact with the tool, where at least a portion of the cavity is retained within the resulting composite structure.

According to one embodiment, the method to fabricate a composite structure includes the first surface of the laminate template including at least two bends.

According to one embodiment, the method to fabricate a composite structure includes the second template surface of the tool including one or more bends.

According to one embodiment, the method to fabricate a composite structure includes providing the laminate template, which includes forming the laminate template, which further includes providing a template-forming tool with a third template surface having the bend, providing a third prepreg layup having first and second opposing surfaces, placing the first surface of the third prepreg layup in contact with the first surface of the template-forming tool, wherein the third prepreg layup substantially adopts the shape of the third template surface including the bend, curing the third prepreg layup while contacting the template-forming tool to form the laminate template, and removing the cured laminate template from the template-forming tool.

According to one embodiment, the method to fabricate a composite structure includes imparting a roughness to a first surface of the laminate template to form the first template surface of the laminate template.

According to another embodiment, a method to fabricate a composite structure is provided. The method includes providing a first laminate template including a first body extending longitudinally between a first end and a second end, a first flange extending transversely from a first side of the first body at about its first end, and a first bend interconnecting the first flange and the first end of the first body, where a second side of the first body, an outer radius of the first bend, and a first side of the first flange form a template surface of the first laminate template. The method further includes providing a second laminate template including a second body extending longitudinally between a first end and a second end, a second flange extending transversely from a first side of the second body at about its first end, and a second bend interconnecting the second flange and the first end of the second body, where a second side of the second body, an outer radius of the second bend, and a first side of the second flange form a template surface of the second laminate template. The method additionally includes providing a first prepreg layup including first and second opposing surfaces, providing a second prepreg layup including first and second opposing surfaces, securing at least a portion of the first surface of the first prepreg layup to the template surface of the first laminate template to form a first laminate template-prepreg, securing at least a portion of the first surface of the second prepreg layup to the template surface of the second laminate template to form a second laminate template-prepreg, positioning the first laminate template-prepreg with respect to the second laminate template-prepreg such that the second surface of the first body of the first prepreg layup longitudinally contacts the second surface of the second body of the second prepreg layup, and co-curing the first and second composite-template prepregs after positioning the first and second laminate template prepregs.

According to one embodiment, the method to fabricate a composite structure includes providing a third prepreg layup having first and second opposing surfaces, securing the first surface of the third prepreg layup to a first tool, prior to the co-curing, positioning at least a portion of the second surface of the third prepreg layup in contact with a second side of the first flange and a second side of the second flange, and where the co-curing comprises the first and second composite-template prepregs after positioning the first and second laminate template prepregs and the third prepreg after the positioning of the third prepreg layup.

According to one embodiment, the method to fabricate a composite structure includes the first laminate template that includes a third flange extending transversely from the first side of the first body at about its second end, and a third bend interconnecting the third flange and the first body at about the second end. The method further includes providing the second laminate template that includes a fourth flange extending transversely from the first side of the second body at about its second end, and a fourth bend interconnecting the fourth flange and the second body at about the second end.

According to one embodiment, the method to fabricate a composite structure includes the first and third flanges being oriented at approximately 90° to the first body, and the second and fourth flanges being oriented at approximately 90° to the second body.

According to one embodiment, the method to fabricate a composite structure includes the first body of the first laminate template being substantially planar between the first bend and the third bend, and the second body of the second laminate template being substantially planar between the second bend and the fourth bend.

According to one embodiment, the method to fabricate a composite structure includes providing a third prepreg layup having first and second opposing surfaces, securing the first surface of the third prepreg layup to a first tool, and providing a fourth prepreg layup having first and second opposing surfaces. The method further includes securing the first surface of the fourth prepreg layup to a second tool, prior to the co-curing, positioning at least a portion of the second surface of the third prepreg layup in contact with a second side of the first flange and a second side of the second flange, and prior to the co-curing, positioning at least a portion of the second surface of the fourth prepreg layup in contact with a second side of the third flange and a second side of the fourth flange, where the co-curing comprises the first and second composite-template prepregs after positioning the first and second laminate template prepregs, the third prepreg after the positioning of the third prepreg layup, and the fourth prepreg after the positioning of the fourth prepreg layup.

DETAILED DESCRIPTION

Figure 1:
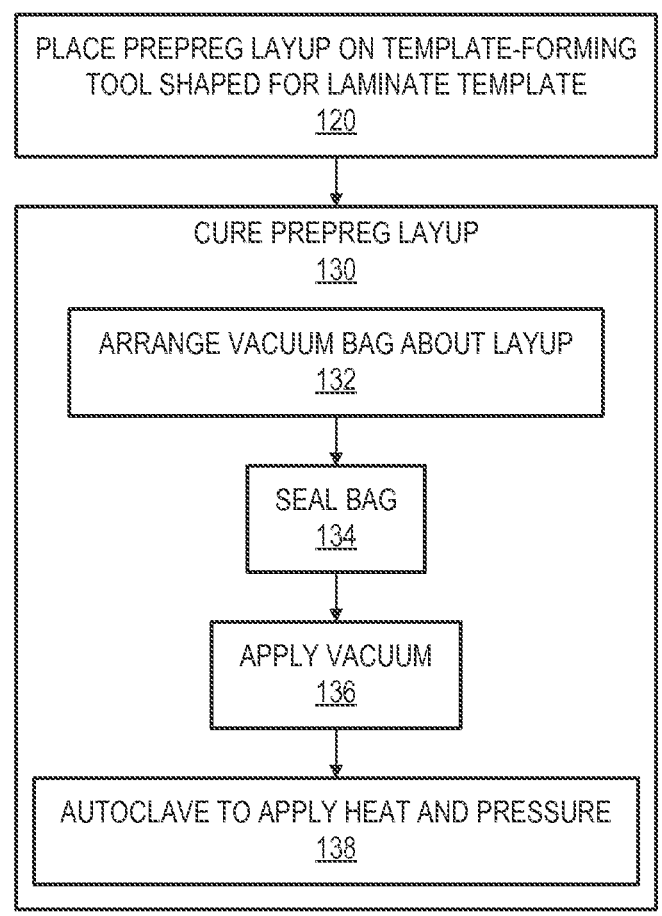
FIG. 1 is a schematic flow diagram showing operations of one embodiment of a method to fabricate a laminate template.

Embodiments of the present disclosure provide methods for improved manufacturing of complex composite structures. The systems and methods disclosed herein may be used to fabricate and assemble composite structures, including but not limited to, structures for aircraft, automobiles, boats, wind turbines, etc.

Fiber-reinforced composites are structural materials which include a continuous matrix reinforced with a fibrous material disposed therein. Due to their high strength and low weight (i.e., specific strength) compared to metallic structures, polymer-matrix composite (PMC) structures are increasingly used as load-bearing components in aircraft. For example, PMC structures may be formed as laminates, including two or more lamina with the reinforcing fiber and matrix. Typically, complex PMC structures are assembled from two or more individual PMCs that are pre-formed to a selected shape and joined together.

For example, a wing component may include stringers, ribs, spars, and a top and bottom skin, which are each shaped separately from laminated PMCs, then joined together. Existing joining techniques for composite materials include mechanical fasteners, adhesive bonding, combined mechanical fasteners and adhesive bonding, and co-curing.

Mechanical fasteners (e.g., bolts and/or rivets) are typically employed for use with relatively thick composite panels or those which are expected to be heavily loaded. Notably, however, holes are formed in the composite structures for through-passage of the mechanical fasteners. These holes concentrate stress and may give rise to unacceptably high stress within the composite structures in service.

Adhesively bonded joints employ a suitable adhesive between two composite structures and are typically employed for relatively lightly loaded parts. Advantageously, adhesive bonds provide design flexibility, relatively uniform stress distribution as compared to mechanical joints, and little to no additional weight. However, an adhesive bond may be weakened by poor manufacturing (e.g., weak adhesive, poor adhesion, etc.), environmental conditions and/or service-induced damage (e.g., voids, disbonds). Furthermore, it can be difficult to assess the integrity of an adhesive bond after joining or test to the quality and performance of the bonded joint during service.

In certain embodiments, composite laminate components are joined together by adhesive bonding. In the case where the components to be bonded are fully cured, the bonding process may further employ an adhesive interposed between the two components. In the case where at least one of the components to be bonded is uncured or partially cured, the bonding process is referred to as co-bonding and may optionally employ an adhesive. In either bonding or co-bonding processes, the components are secured to one another along an interface there-between, referred to as a bond joint or a bond line. In general, the process of bonding fully-cured components together is easier than co-bonding partially-cured components, as the fully-cured components retain their shape during handling without support. In contrast, during co-bonding of partially-cured and/or uncured components, additional support of the components is generally employed to ensure that the partially-cured components retain their desired shape.

For aircraft structures assembled from composite structures by bonding, United States Federal Aviation Regulations (e.g., FAR § 23.573) governs the damage tolerance and fatigue properties required for use. This regulation directs that any critical bonded joint (i.e., a joint that, should it fail during operation of the aircraft, would result in catastrophic loss of the aircraft), be capable of supporting a selected limit load when experiencing a defined degree of disbonding.

Satisfying this requirement may be difficult for complex composite structures. For example, the limit load capability of the composite must be established by mechanical testing or analysis supported by testing. However, it may be difficult to conduct a mechanical test or employ analysis supported by mechanical testing, in the case of complex shaped components.

One technique to address this difficulty is the use of additional mechanisms to prevent disbond propagation, such as fasteners or designed geometries. The added weight, complexity, and/or cost of manufacture accompanying these mechanisms, though, may render them undesirable for use in the case of some complex composites.

In a co-curing process, one or more partially-cured laminates are joined to one another, after being arranged in contact with one another, by a heat treatment that fully cures each laminate. In the curing process, the polymer matrices are able to flow and mix between components, leading to a single polymer matrix at one or more interfaces between the two laminates. Upon hardening, a monolithic structure is created that lacks the bond lines or bonded joints at the interface between components formed during bonding or co-bonding.

However, existing design, tooling and fabrication of co-cured structures are limited in scope because handling and arranging uncured or partially cured laminates is more challenging than handling and arranging fully cured components, as described above. This is why prior art methods typically rely on bonding or co-bonding processes to form complex structures.

Embodiments of the disclosure described herein use composite laminates, which are shaped to form templates then fully cured prior to use as a template, which will be referred to as "pre-cured" herein. The pre-cured laminate templates support additional uncured or partially cured composite lamina, which are subsequently co-cured together. The resulting structure includes one monolithic component with a physically integrated laminate template and substantially no bond lines or bonded joints.

The laminate templates described herein are designed to provide mechanical strengths above limit loads. When co-cured together, laminate templates and additional composite lamina provide structural strength for attaining an "ultimate" load. Manufacturers must demonstrate, as described above, that composite aircraft structures can also withstand the ultimate load, which is 50% higher than the limit load, to provide a margin of safety. As a result, the thickness of the laminate template is, for example, about one third of the total component thickness or less, which includes the laminate template and additional lamina. In other words, because the limit load is one third less than the ultimate load, the laminate template thickness is typically about one third or less of the total component thickness. However, if disbonding occurs between the laminate template and additional lamina, the component still meets the limit load requirement of the Federal Aviation Regulations described above due to the strength of the additional lamina.

Embodiments of the present disclosure include methods for fabricating composite structures that replace tooling and fasteners with a pre-cured laminate template. The laminate template is first cured to the required shape (i.e., pre-cured). A surface of the laminate template may then be prepared for joining to additional structural lamina. A final co-curing produces a composite structure lacking bond lines or bonded joints. The laminate templates also serve to support additional structural lamina for formation of complex structures, replacing the use of a template tool from conventional methods. Advantages of embodiments of the methods described herein include manufacture of complex co-cured structures that are not feasible using existing methods, reduced time and cost to form the structures, and improved strength with minimal additional weight.

Figure 2:
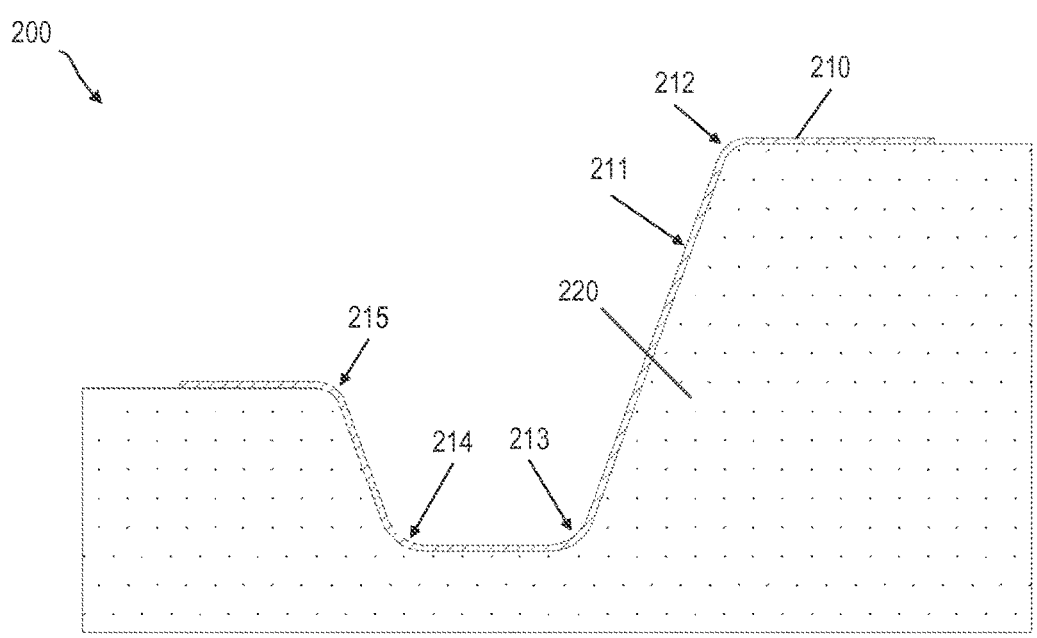
FIG. 2 is a schematic cross-sectional view showing one embodiment of the laminate template of FIG. 1 on a tool.

FIG. 1 shows a schematic flow diagram of an embodiment of a method 100 for making a laminate template. FIG. 2 is a schematic cross-sectional view 200 showing an embodiment of laminate template 210, having been formed on a template-forming tool 220 according to method 100 of FIG. 1, for example. In an operation 120, a composite lamina is placed on tool 220. The composite lamina includes, for example, reinforcing fiber that has been pre-impregnated with resin, which is referred to hereinbelow as a prepreg layup. In operation 130, the prepreg layup is cured to make laminate template 210 in the shape of tool 220. Tools may be configured in a variety of different shapes (see for example FIG. 7) without departing from the scope hereof. Operation 130 includes a step 132 for arranging a vacuum bag around the prepreg layup, a step 134 for sealing the vacuum bag, a step 136 for applying a vacuum, and a step 138 for autoclaving the bagged prepreg layup to apply heat and pressure. After curing the prepreg layup using operation 130 of method 100, laminate template 210 is removed from tool 220.

Alternative methods for fabricating laminate template 210 may be used, such as wet layup, high and low pressure Resin Transfer Molding (RTM), Vacuum-Assisted Resin Transfer Molding (VARTM), and Same Qualified Resin Transfer Molding (SQUIRTM), without departing from the scope hereof.

Figure 3:
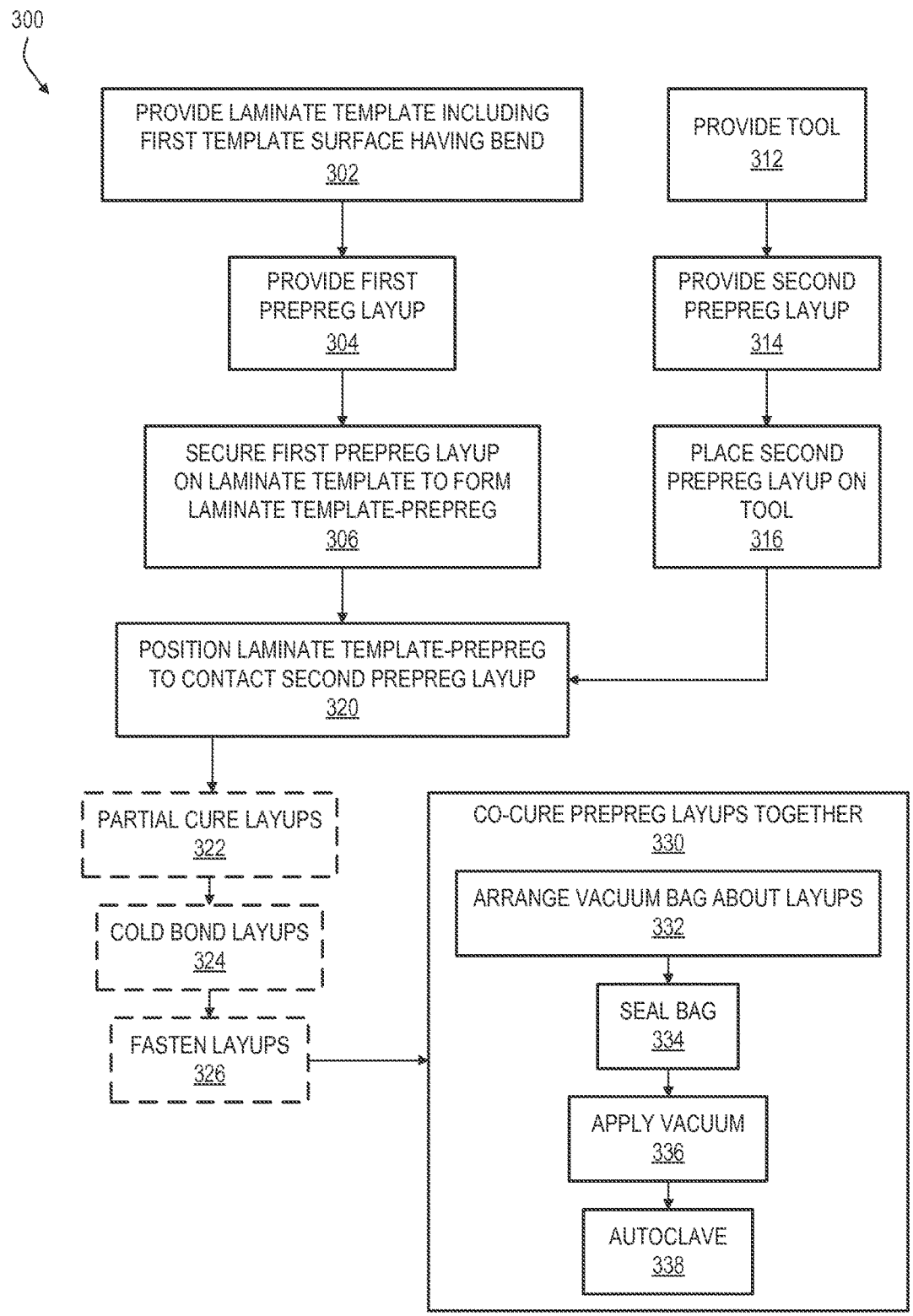
FIG. 3 is a schematic flow diagram showing operations of one embodiment of a method to fabricate complex composite structures using a laminate template.
Figure 4:
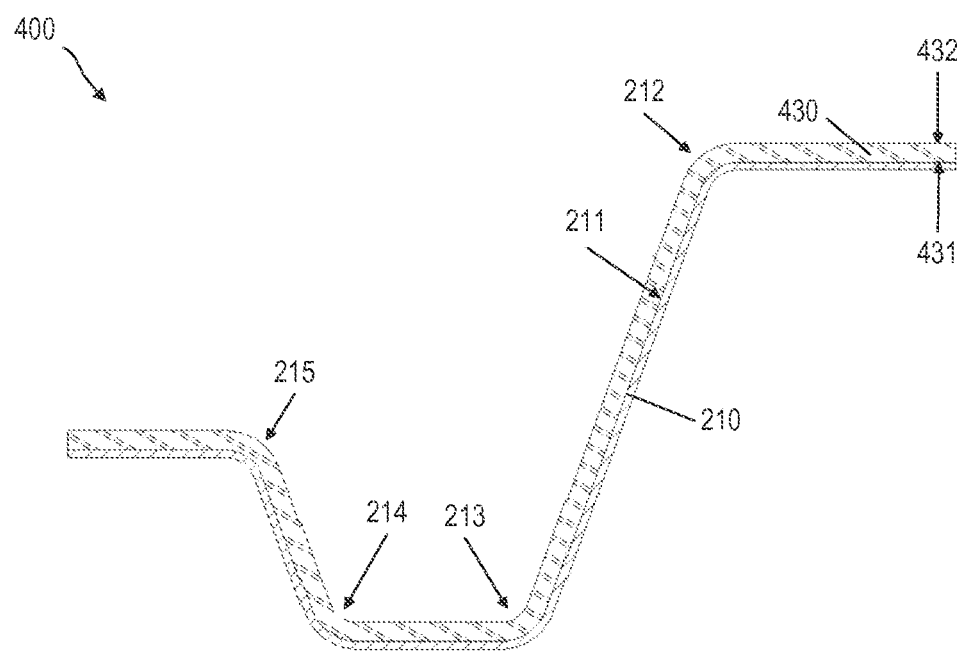
FIG. 4 is a schematic cross-sectional view showing one embodiment of a prepreg layup on a laminate template.
Figure 5:
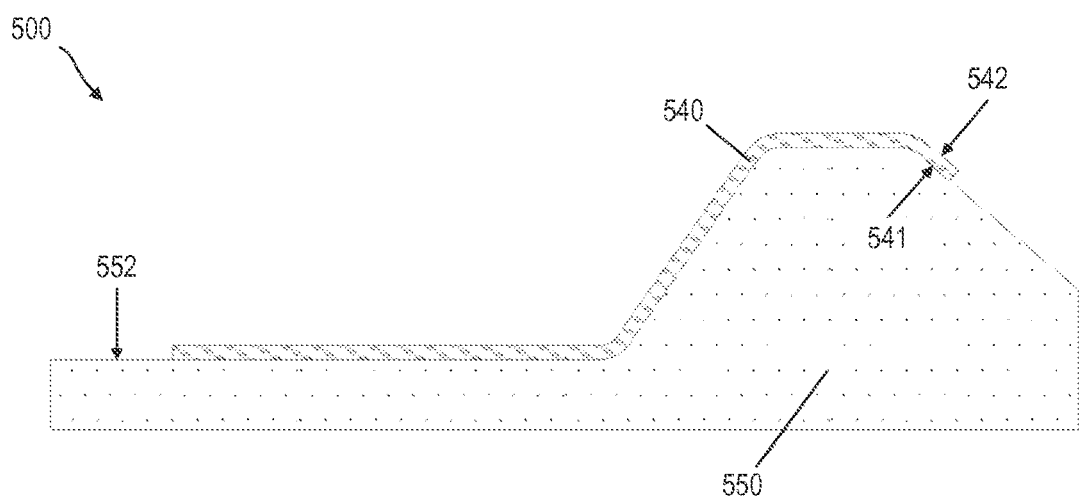
FIG. 5 is a schematic cross-sectional view showing one embodiment of a prepreg layup on a tool.
Figure 6:
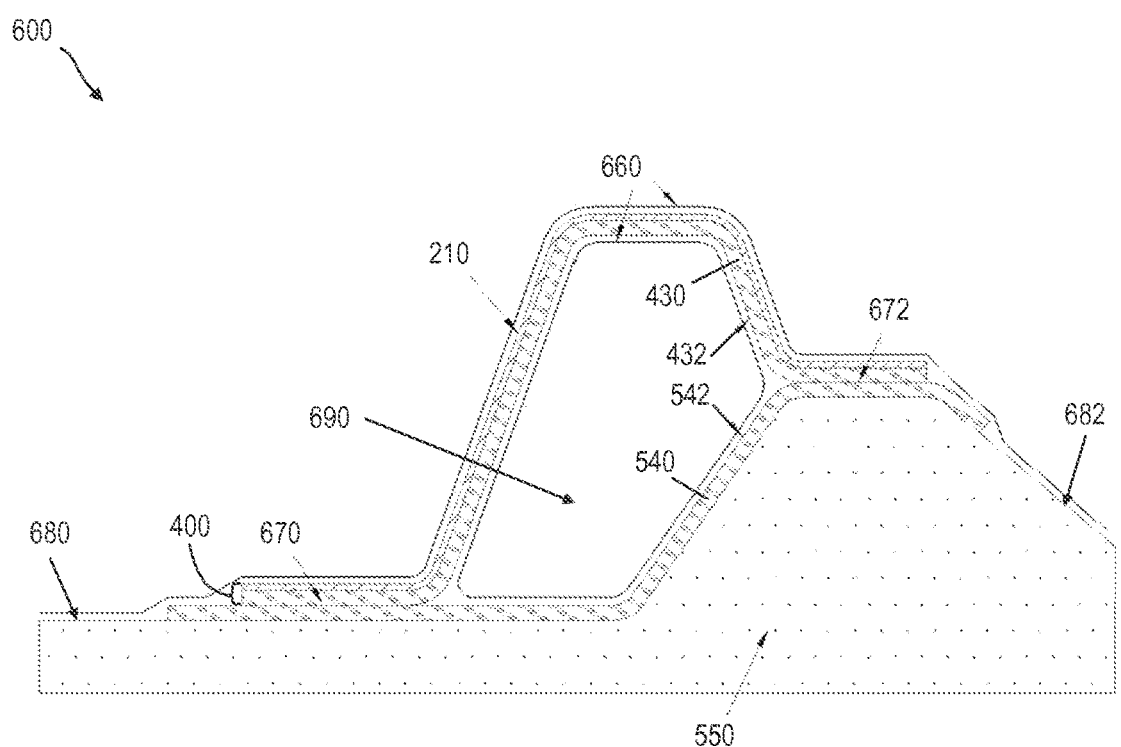
FIG. 6 is a schematic cross-sectional view showing one embodiment of the prepreg layup and laminate template of FIG. 4 arranged on the prepreg layup and tool of FIG. 5 to form a cavity therebetween.

FIG. 3 is a schematic flow diagram showing operations of one embodiment of a method 300 to fabricate complex laminates with a laminate template made using method 100 of FIG. 1. Examples of components fabricated according to method 300 are shown in FIGS. 4-6. The order of operations, described below, may be altered without departing from the scope hereof. For example, operations 312, 314, and 316 may be performed before, or at the same time as, operations 302, 304, and 306.

In an operation 302, a laminate template is provided that includes a first template surface having a bend. In an example of operation 302, laminate template 210 is provided that includes a first template surface 211. FIG. 2 shows a cross-sectional view 200 of laminate template 210 on a template-forming tool 220 with a first bend 212, a second bend 213, a third bend 214, and a fourth bend 215. Each bend is considered distinct from the other bends if a generally straight portion extends therebetween. The term bend is intended to include any generally non-planar surface, including curved, bowed, concave, convex, and rounded surfaces. Template-forming tool 220 and laminate template 210 may have fewer or greater than four bends without departing from the scope hereof.

In an embodiment, first surface 211 of laminate template 210 is prepared for co-curing. Surface preparation may include for example roughening the surface by grit blasting, sanding, plasma etching, or laser ablation. Roughening of the surface increases microscopic surface area for improved penetration by a composite matrix material, such as an epoxy. Surface preparation may also include removal of contaminants following roughening with alcohol cleaning, for example.

In an operation 304, a first prepreg layup is provided having first and second opposing surfaces. In an example of operation 304, first prepreg layup 430 is provided having a first surface 431 and a second surface 432, as schematically illustrated with a cross-sectional view in FIG. 4.

In an operation 306, at least a portion of the first surface of the first prepreg layup is secured to the first template surface including the bend to form a laminate template-prepreg, such that the portion of the first prepreg layup secured to the laminate template substantially adopts the shape of the first template surface. The term "substantially adopts the shape" is meant to convey that the shape of the first prepreg layup adopts the shape of the first template surface including the bend, but the term is meant to account for slight deviations in shape. In particular, slight deviations in shape may occur in locations such as the bend, especially if the bend includes a short radius of curvature relative to the thickness of the laminate template-prepreg, or in other words, if the first template surface includes a tight or sharp bend. The bend of the laminate template may possess an internal radius of curvature less than for example 0.25 inch. In an example of operation 306, at least a portion of first surface 431 of first prepreg layup 430 is secured to first template surface 211 of laminate template 210 to form a laminate template-prepreg 400, as shown in FIG. 4. First prepreg layup 430 substantially adopts the shape of first template surface 211 including first bend 212, second bend 213, third bend 214, and fourth bend 215.

In an operation 312, a tool is provided having a second template surface. In an example of operation 312, a tool 550 is provided having a second template surface 552, as shown in FIG. 5. Tool 550 includes three bends, but the tool may include greater or fewer number of bends (see for example FIG. 7) without departing from the scope hereof. In an embodiment, tool 550 is simply a flat surface.

In an operation 314, a second prepreg layup is provided including first and second opposing surfaces. In an example of operation 314, second prepreg layup 540 is provided including first surface 541 and second surface 542.

In an operation 316, at least a portion of the first surface of the second prepreg layup is placed in contact with the second template surface of the tool such that the second prepreg layup substantially adopts the shape of the second template surface of the tool. In an example of operation 316, first surface 541 of second prepreg layup 540 is placed in contact with second template surface 552 of tool 550 such that second prepreg layup 540 substantially adopts the shape of second template surface 552 of tool 550, as shown in FIG. 5.

In an operation 320, the laminate template-prepreg is positioned with respect to the second prepreg layup such that at least a portion of the second surface of the first prepreg layup contacts the second surface of the second prepreg layup. In an example of operation 320, laminate template-prepreg 400 is positioned with respect to second prepreg layup 540 such that at least a portion of second surface 432 of first prepreg layup 430 contacts the second surface 542 of second prepreg layup 540. As shown in FIG. 6, a first portion of second surface 432 contacts second surface 542 at a first interface 670, and a second portion of second surface 432 contacts second surface 542 at a second interface 672.

In an embodiment, partial curing is used to secure first prepreg layup 430 in contact with laminate template 210 during operation 306. For example, partial curing may be used when prepreg layup 430 is to be oriented beneath its laminate template 210 with respect to gravity, as depicted in FIG. 6.

In an embodiment, operation 320 uses laminate template 210 to provide structural support to first prepreg layup 430 for maintaining the shape provided by first template surface 211 while transferring first prepreg layup 430 to second prepreg layup 540. In an embodiment, operation 320 forms a cavity 690 between first and second prepreg layups 430, 540 and between first and second interfaces 670, 672, as shown in FIG. 6.

Optionally, operation 322 is used to partially cure prepreg layups together. In an example of operation 322, first prepreg layup 430 is partially cured with second prepreg layup 540. Partial curing is an example of operation 130 of FIG. 1 with a reduced amount of autoclaving (step 138), which results in curing to less than fully cured strength.

Optionally, operation 324 cold bonds the prepreg layups together. In an example of operation 324, first prepreg layup 430 is cold bonded to second prepreg layup 540. Cold bonding may require surface preparation of each faying surface and may include application of adhesive.

Optionally, operation 326 fastens the prepreg layups together. In an example of operation 326, first prepreg layup 430 is fastened to second prepreg layup 540. Fastening may include use of metal fasteners.

In operation 330, the laminate template-prepreg and the second prepreg layup are co-cured together after operation 320 to form a composite structure. Operation 330 is an example of operation 130 of FIG. 1. Specifically, operation 330 includes a step 332 (which is an example of step 132) for arranging a vacuum bag around the prepreg layups, a step 334 (which is an example of step 134) for sealing the vacuum bag, a step 336 (which is an example of step 136) for applying a vacuum, and a step 338 (which is an example of step 138) for autoclaving the bagged prepreg layups to apply heat and pressure. In an example of step 332, vacuum bag 660 is arranged around prepreg layups 430, 540 and laminate template 210, as shown in FIG. 6, which may include one or more of external, internal, or envelope bagging. In an example of step 334, vacuum bag 660 is sealed to tool 550 at a first surface 680 and a second surface 682, as shown in FIG. 6.

Composite structures formed using method 300 of FIG. 3 include one or more laminate templates as a physically integrated part of the final component. Use of laminate templates to fabricate complex structures with composite materials avoids the need to bond composite components together and replaces tooling. Advantages include avoiding the use of adhesive bonds and enabling formation of complex shapes by providing structural support while arranging prepreg layups. This translates to reduced assembly time and labor for quicker and more cost effective manufacture. Use of laminate templates also dramatically reduces the use of metal fasteners needed for additional support. This is an important advantage for aircraft because metal fasteners provide a path for lightning that may increase damage in the event of a lightning strike.

Figure 7:
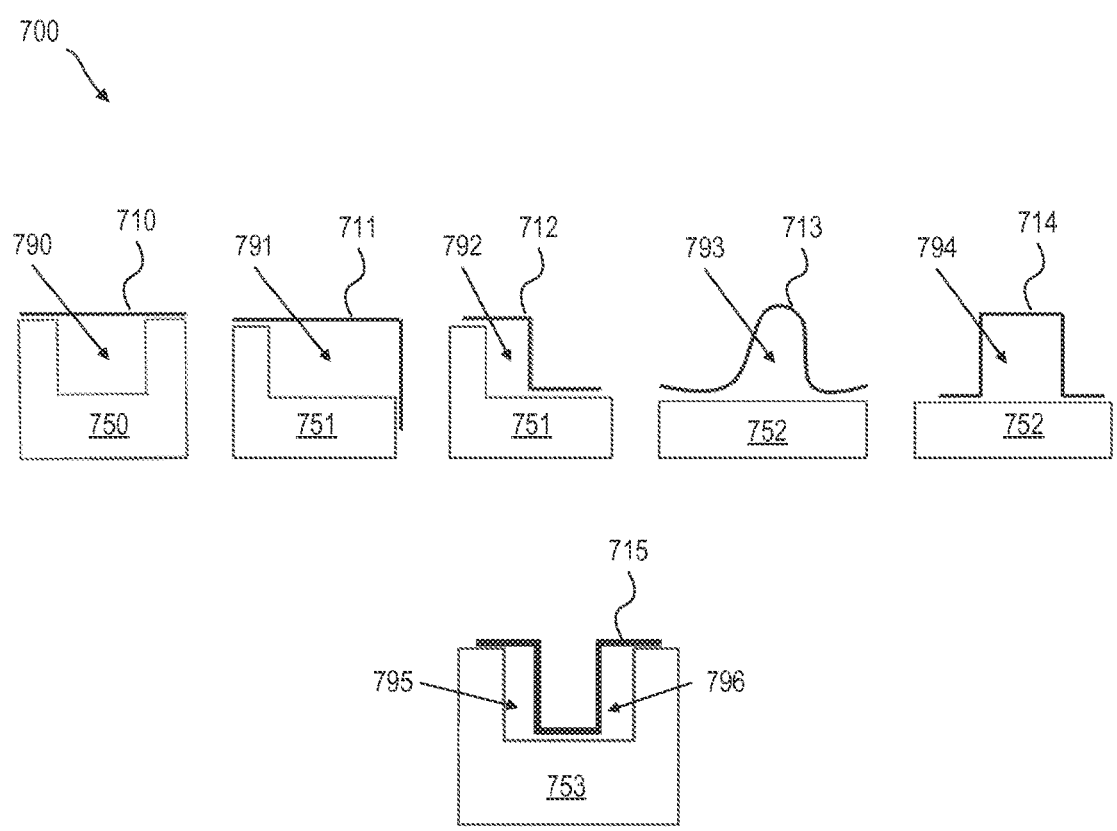
FIG. 7 includes schematic cross-sectional views showing embodiments of a laminate template on a tool for forming cavities.

FIG. 7 is a series of schematic cross-sectional views 700 showing embodiments of laminate templates on tools for forming cavities. Note that prepreg layups are not shown in FIG. 7 for clarity of illustration. Cavity 690 of FIG. 6 results from bends in laminate template 210 and tool 550, but formations of cavities are not confined to the shapes shown in FIG. 6. Cavities may be any hollow enclosed region formed between laminates without departing from the scope hereof. For example, laminate template 710, which is an example of laminate template 210 of FIG. 2, has no bends. Tool 750, which is an example of tool 550 of FIG. 5, forms cavity 790, which is an example of cavity 690 of FIG. 6. Other configurations are possible, including at least laminate template 711 with one bend on tool 751 to cavity 791, shell 712 with two bends on tool 751 to form cavity 792, shell 713 with three bends on tool 752 to form cavity 793, shell 714 with four bends on tool 752 to form cavity 794, and shell 715 with four bends on tool 753 to form a first cavity 795 and a second cavity 796. In an alternative embodiment, more than two cavities are formed using one laminate template.

Figure 8:
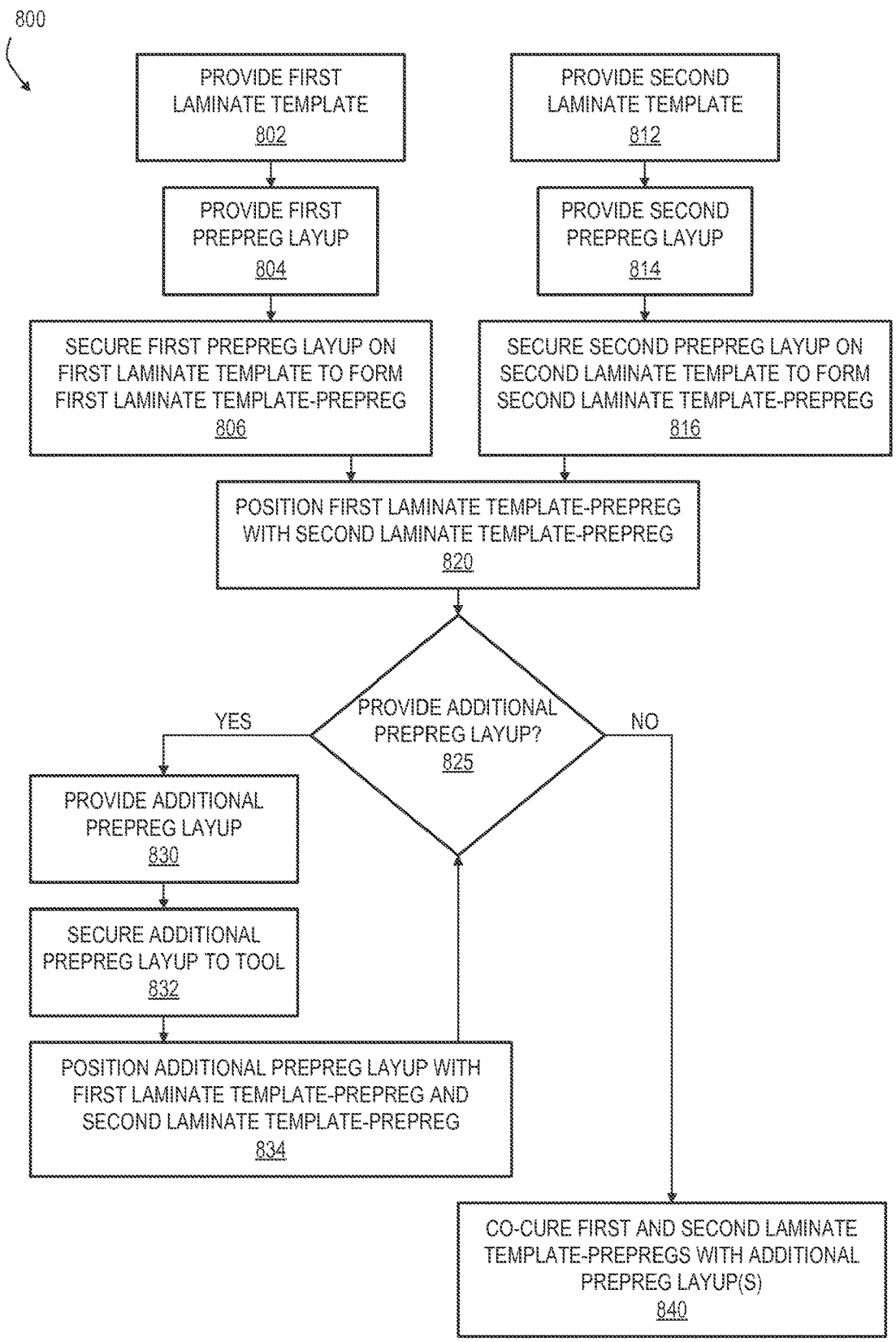
FIG. 8 is a schematic flow diagram showing operations of one embodiment of a method to fabricate complex composite structures using laminate templates.
Figure 9A:
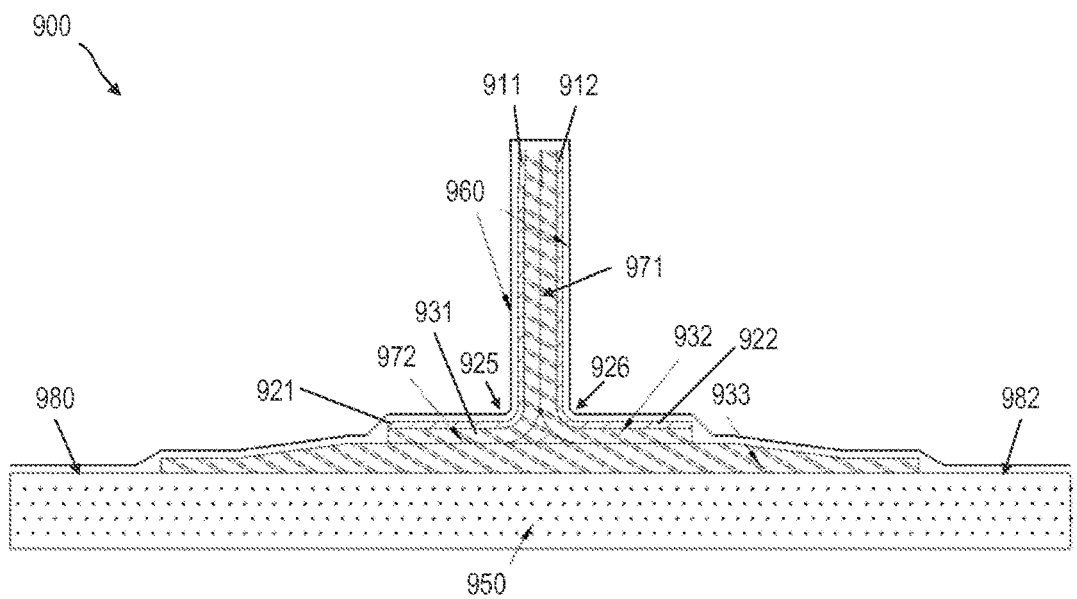
FIG. 9A is a schematic cross-sectional view showing one embodiment of a T-shaped structure formed using the method of FIG. 8.

FIG. 8 is a schematic flow diagram showing operations of one embodiment of a method 800 to fabricate complex composite structures using laminate templates. Method 800 is an example of method 300 of FIG. 3 using more than one laminate template. The order of operations of method 800, described below, may be altered without departing from the scope hereof. For example, operations 812, 814, and 816 may be performed before, or at the same time as, operations 802, 804, and 806. FIG. 9A is a schematic cross-sectional view showing one embodiment of a composite structure 900 formed using method 800 of FIG. 8.

In operation 802, a first laminate template is provided. In an example of operation 802, first laminate template 911 of FIG. 9A is provided using method 100 of FIG. 1. First laminate template 911 includes a first body extending longitudinally between a first end and a second end, a first flange 921 extending transversely from a first side of the first body at about its first end, and a first bend 925 interconnecting the first flange and the first end of the first body. In an embodiment, a second side of the first body, an outer radius of first bend 925, and a first side of the first flange 921 form a template surface of first laminate template 911. First bend 925 forms an approximately ninety degree (90°) angle between the first body of first laminate template 911 and first flange 921 as shown in FIG. 9A, but other angles may be formed without departing from the scope hereof. The template surface of first laminate template 911 is prepared for co-curing by roughening the surface (e.g., by grit blasting, sanding, plasma etching, or laser ablation), and by alcohol cleaning, for example.

In operation 804, a first prepreg layup including first and second opposing surfaces is provided. In an example of operation 804, a first prepreg layup 931 is provided.

In operation 806, at least a portion the first surface of the first prepreg layup is secured to the first laminate template to form a first laminate template-prepreg. In an example of operation 806, the first surface of first prepreg layup 931 is secured to the template surface of first laminate template 911 to form the first laminate template-prepreg. In an embodiment, partial curing is used to secure first prepreg layup 931 in contact with laminate template 911 during operation 806.

In operation 812, a second laminate template is provided. In an example of operation 812, second laminate template 912 of FIG. 9A is provided using method 100 of FIG. 1. Second laminate template 912 includes a second body extending longitudinally between a first end and a second end, a second flange 922 extending transversely from a first side of the second body at about its first end, and a second bend 926 interconnecting second flange 922 and the first end of the second body. In an embodiment, a second side of the second body, an outer radius of second bend 926, and a first side of the second flange 922 form a template surface of second laminate template 912. Second bend 926 forms an approximately ninety-degree angle between the second body of second laminate template 912 and second flange 922 as shown in FIG. 9A, but other angles may be formed without departing from the scope hereof. The template surface of second laminate template 912 is prepared for co-curing by roughening the surface (e.g., by grit blasting, sanding, plasma etching, or laser ablation), and by alcohol cleaning, for example.

In operation 814, a second prepreg layup including first and second opposing surfaces is provided. In an example of operation 814, a second prepreg layup 932 is provided.

In operation 816, at least a portion the first surface of the second prepreg layup is secured to the second laminate template to form a second laminate template-prepreg. In an example of operation 816, the first surface of second prepreg layup 932 is secured to the template surface of second laminate template 912 to form the second laminate template-prepreg. In an embodiment, partial curing is used to secure second prepreg layup 932 in contact with second laminate template 912 during operation 816.

In operation 820, the first laminate template-prepreg is positioned with respect to the second laminate template-prepreg. In an example of operation 820, the first laminate template-prepreg is positioned with respect to the second laminate template-prepreg such that the second surface of the first body of first prepreg layup 931 longitudinally contacts the second surface of the second body of second prepreg layup 932. A first interface 971 illustrates the first body of first prepreg layup 931 in exemplary contact with the second body of second prepreg layup 932 in FIG. 9A. Other arrangements between first laminate template-prepreg and second laminate template prepreg may be formed in operation 820 without departing from the scope hereof. Laminate templates 911, 912 provide support to first and second prepreg layups 931, 932, respectively, for positioning together.

Operation 825 is a decision. If in operation 825 an additional prepreg layup is desired for positioning with either first laminate template-prepreg, second laminate template-prepreg, or both first and second laminate template-prepregs, method 800 proceeds to operation 830. Otherwise, method 800 proceeds to operation 840 to co-cure the first and second laminate template-prepregs.

Operation 840 of FIG. 8 is an example of operation 330 of FIG. 3, and includes arranging a vacuum bag about first and second laminate templates 911, 912, and first, second, prepreg layups 931, 932. The remaining steps of co-curing in operation 840 include sealing a vacuum bag, applying a vacuum, and autoclaving the bagged prepreg layups to apply heat and pressure. First and second composite-template prepregs are co-cured together along first interface 971. The resulting T-shaped structure consists of a monolithic composite structure lacking bonded joints.

In an embodiment, a decision is made in operation 825 to provide an additional prepreg layup with operation 830. For example, a third prepreg layup 934 having first and second opposing surfaces is provided with operation 830.

In operation 832, the additional prepreg layup is secured to a first tool. In an example of operation 832, the first surface of third prepreg layup 933 is secured to first tool 950.

In operation 834, the additional prepreg layup is positioned with respect to the first laminate template-prepreg and the second laminate template-prepreg. In an example of operation 834, at least a portion of the second surface of third prepreg layup 933 is positioned in contact with the second surface of first prepreg layup 931 at first flange 921 and a second surface of second prepreg layup 932 at second flange 922. A second interface 972 illustrates exemplary contact between third prepreg layup 933 and first and second laminate template-prepregs. In an embodiment, second interface 972 is substantially orthogonal to first interface 971, as depicted in FIG. 9A. Other arrangements between third prepreg layup 933 and first and second laminate template-prepregs may be formed in operation 834 without departing from the scope hereof.

Laminate templates 911, 912 provide support to first and second prepreg layups 931, 932, respectively, for positioning together with third prepreg layup 933. Specifically, first flange 921 of first laminate template 911 maintains an approximately ninety-degree angle of first bend 925 in first prepreg layup 931, as shown in FIG. 9A, prior to positioning with third prepreg layup 933. Similarly, second flange 922 of second laminate template 912 maintains an approximately ninety-degree angle of second bend 926 in second prepreg layup 932, as shown in FIG. 9A, prior to positioning with third prepreg layup 933.

Following operation 834, method 800 returns to operation 825. If an additional prepreg layup is desired, for example a fourth prepreg layup, method 800 proceeds with operation 830. Otherwise, method 800 proceeds to operation 840 to co-cure the first and second laminate template-prepregs with third prepreg layup 933.

Operation 840 of FIG. 8 is an example of operation 330 of FIG. 3, and includes arranging a vacuum bag 960 about first and second laminate templates 911, 912, and first, second, and third prepreg layups 931, 932, 933 (see FIG. 9A). Vacuum bag 960 is sealed to first tool 950 at a first location 980 and a second location 982, for example. The remaining steps of co-curing operation 840 include sealing vacuum bag 960, applying a vacuum, and autoclaving the bagged prepreg layups to apply heat and pressure. First and second composite-template prepregs are co-cured together along first interface 971 and with third prepreg layup 933 along second interface 972. After removing first tool 950, the resulting T-shaped structure consists of a monolithic composite structure lacking bonded joints.

Figure 9B:
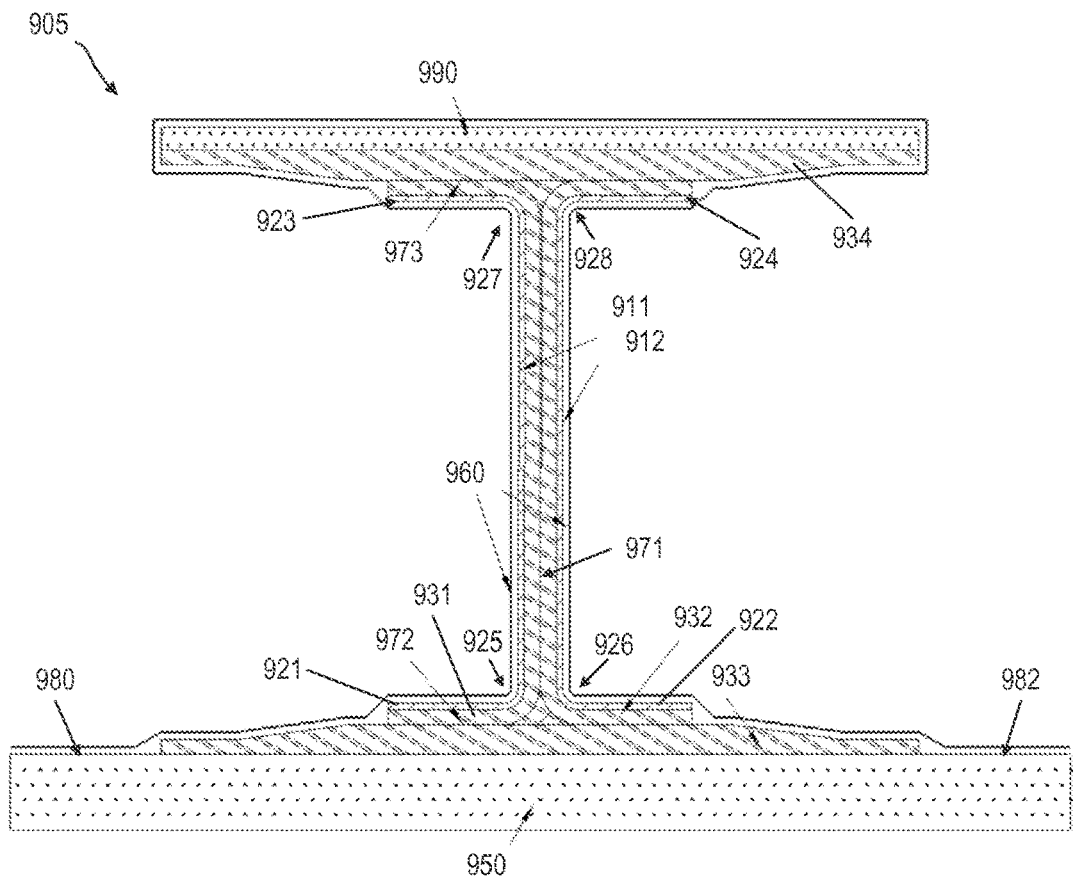
FIG. 9B is a schematic cross-sectional view showing one embodiment of an I-beam structure formed using the method of FIG. 8.

FIG. 9B is a schematic cross-sectional view showing one embodiment of a composite structure 905 formed using method 800 of FIG. 8. According to another embodiment, first laminate template 911 includes a third flange 923 extending transversely from the first side of the first body at about its second end, and a third bend 927 interconnecting third flange 923 and the first body at about the second end, as shown in FIG. 9B. Similarly, second laminate template 912 includes a fourth flange 924 extending transversely from the first side of the second body at about its second end, and a fourth bend 928 interconnecting fourth flange 924 and the second body at about the second end, as shown in FIG. 9B. Third bend 927 forms an approximately ninety-degree angle between the first body of first laminate template 911 and third flange 923 as shown in FIG. 9B, but other angles may be formed without departing from the scope hereof. Similarly, fourth bend 928 forms an approximately ninety-degree angle between the second body of second laminate template 912 and fourth flange 924 as shown in FIG. 9B, but other angles may be formed without departing from the scope hereof.

In an embodiment, the first body of first laminate template 911 is substantially planar between first bend 925 and third bend 927. Similarly, the second body of second laminate template 912 is substantially planar between second bend 926 and fourth bend 928.

In an embodiment, first and second laminate templates 911, 912 are "C-shaped". Although cross-sectional shapes similar to that of laminate templates 911, 912 are referred to as "C-shaped" in the art, they actually include flanges that extend substantially perpendicular (i.e., at an approximately ninety-degree angle) from a main body. Referring to first laminate template 911 of FIG. 9B for example, a first flange 921 and a third flange 923 extend transversely from a first body when observed cross-sectionally. It should be recognized that numerous differently shaped members could be connected together as shown using the processes of the diagram of FIG. 8.

In an embodiment, first laminate template-prepreg having first and third flanges 921, 923 may be co-cured in operation 840 along first interface 971 with second laminate template-prepreg having second and fourth flanges 922, 924, without additional prepreg layups to form an I-beam structure. Alternatively, a third prepreg layup 933 may be provided in operation 830, secured to a first tool in operation 832, and positioned with first and second laminate template-prepregs in operation 834, as described above for a T-shaped structure prior to co-curing in operation 840. Similarly, operations 830 to 834 may be repeated to include a fourth prepreg layup 934 prior to co-curing in operation 840, as described below. The resulting monolithic structure is an I-beam lacking bonded joints, with optional bottom and top laminates provided by third and fourth prepreg layups 933, 934, respectively.

In an embodiment, a decision is made in operation 825 to provide another additional prepreg layup with operation 830. In an example of operation 830, a fourth prepreg layup 934 having first and second opposing surfaces is provided.

In operation 832, the fourth prepreg layup is secured to a second tool. In an example of operation 832, the first surface of fourth prepreg layup 934 is secured to second tool 990. Second tool 990 is a caul sheet, for example.

In operation 834, an additional prepreg layup is positioned with respect to the first laminate template-prepreg and the second laminate template-prepreg. In an example of operation 834, at least a portion of the second surface of fourth prepreg layup 934 is positioned in contact with the second surface of first prepreg layup 931 at third flange 923 and a second surface of second prepreg layup 932 at fourth flange 924. A third interface 973 illustrates exemplary contact between fourth prepreg layup 934 and first and second laminate template-prepregs. In an embodiment, third interface 973 is substantially orthogonal to first interface 971, and third interface 973 is substantially parallel to second interface 972, as depicted in FIG. 9B. The resulting monolithic structure is an I-beam between top and bottom laminates lacking bonded joints, with integrated first and second laminate templates 911, 912. Other arrangements between fourth prepreg layup and first and second laminate template-prepregs may be formed in operation 834 without departing from the scope hereof. For example, first laminate template-prepreg and second laminate template-prepreg may be positioned without directly contacting one another to provide a gap that replaces first interface 971. The resulting I-beam structure includes a gap extending longitudinally between parallel sections of first prepreg layup 931 and second prepreg layup 932.

Laminate templates 911, 912 provide support to first and second prepreg layups 931, 932, respectively, for positioning together with fourth prepreg layup 934. Specifically, third flange 923 of first laminate template 911 maintains an approximately ninety-degree angle of third bend 927 in first prepreg layup 931, as shown in FIG. 9B, prior to positioning with fourth prepreg layup 934. Similarly, fourth flange 924 of second laminate template 912 maintains an approximately ninety-degree angle of fourth bend 928 in second prepreg layup 932, as shown in FIG. 9B, prior to positioning with fourth prepreg layup 934.

Following operation 834, method 800 returns to operation 825. If an additional prepreg layup is desired, for example a fifth prepreg layup, method 800 proceeds with operation 830. Otherwise, method 800 proceeds to operation 840 to co-cure the first and second laminate template-prepregs with third prepreg layup 933 and fourth prepreg layup 934. At any stage in method 800 prior to co-curing, positioning of additional prepreg layups may be aided by partially curing, cold bonding, or fastening, similar to optional steps 322, 324 and 326 of FIG. 3, without departing from the scope hereof.

Operation 840 of FIG. 8 is an example of operation 330 of FIG. 3, and includes arranging a vacuum bag 960 about first and second laminate templates 911, 912, first, second, third and fourth prepreg layups 931, 932, 933, 934, and second tool 990 (see FIG. 9A). Vacuum bag 960 is sealed to first tool 950 at a first location 980 and a second location 982, for example. The remaining steps of co-curing operation 840 include sealing vacuum bag 960, applying a vacuum, and autoclaving the bagged prepreg layups to apply heat and pressure. First and second composite-template prepregs are co-cured together along first interface 971, and with third prepreg layup 933 along second interface 972, and with fourth prepreg 934 along third interface 973. After removing first tool 950 and second tool 990, the resulting I-beam structure consists of a monolithic composite structure lacking bonded joints. First and second laminate templates 911, 912 become integrated within the composite I-beam structure.

Figure 10:
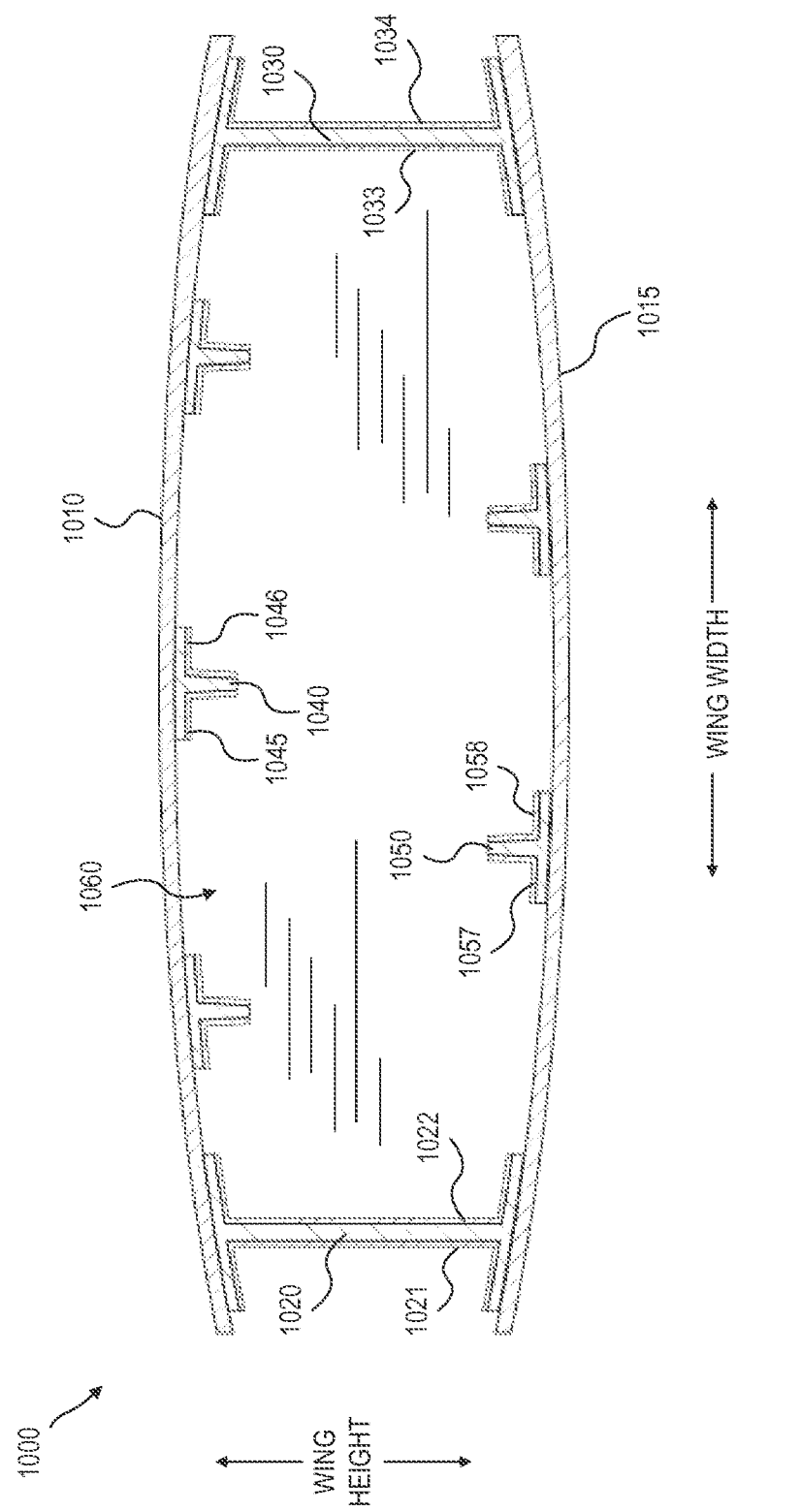
FIG. 10 is a schematic cross-sectional view showing one embodiment of a composite wing section made using laminate templates.

FIG. 10 shows a schematic cross-sectional view of a wing section 1000 made using laminate templates as described herein. The cross-section is oriented with a "wing-height" in the vertical direction and a "wing-width" in the horizontal direction, as depicted in FIG. 10.

Figure 11:
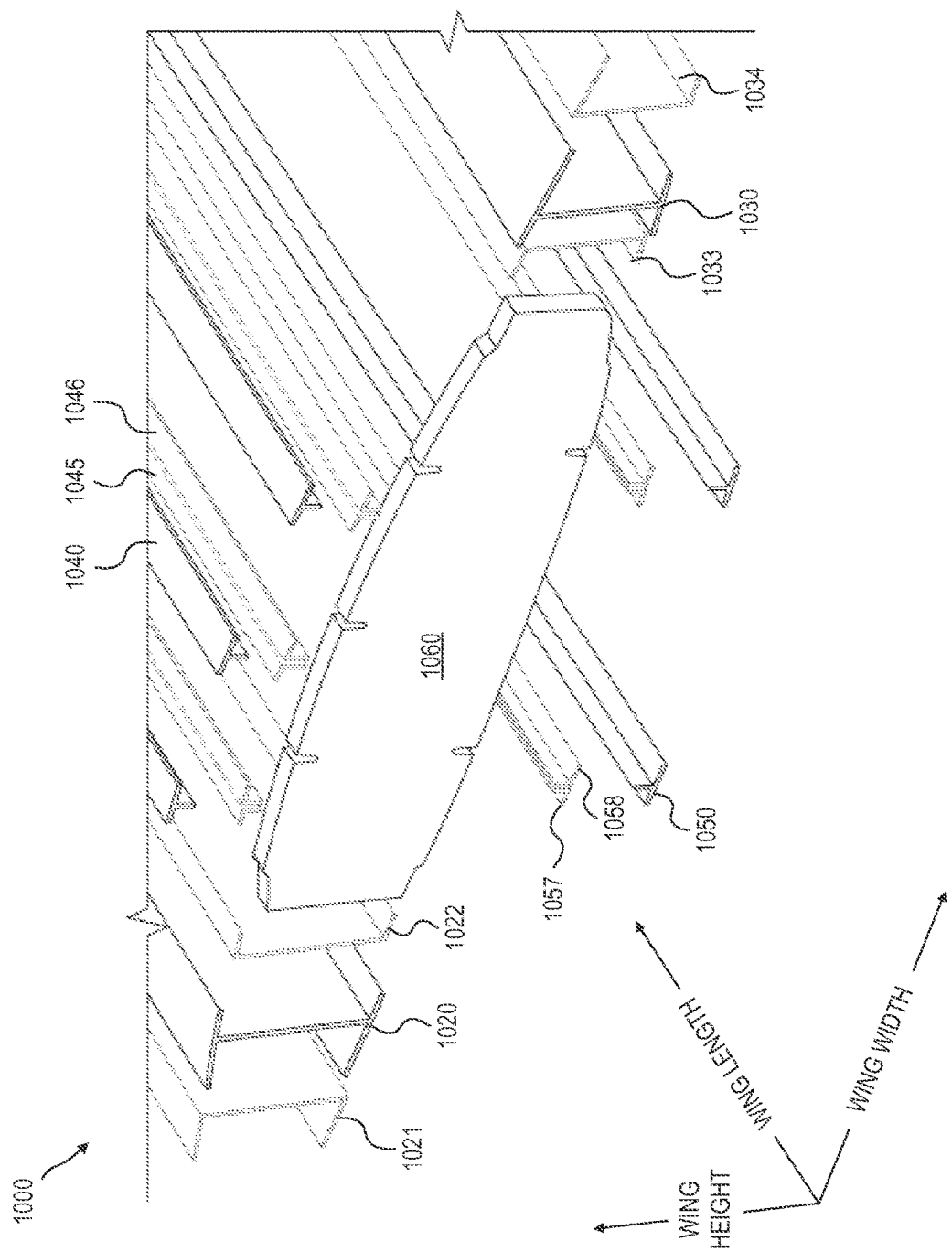
FIG. 11 is a schematic exploded three-dimensional view of the composite wing section of FIG. 10.

FIG. 11 depicts an exploded three-dimensional view of wing section 1000 of FIG. 10. The three-dimensional view is oriented with a "wing-height" and "wing-width" corresponding with FIG. 10, and a "wing-length" to illustrate depth. FIGS. 10 and 11 are best viewed together with the following description.

FIG. 10 shows a wing section 1000 that includes a top skin 1010 and a bottom skin 1015, which are prepreg layups held in place using removable tools (not shown) during co-curing. Top skin 1010 and bottom skin 1015, which are not shown in FIG. 11 for clarity of illustration, form the top and bottom surfaces of a wing, respectively. Wing section 1000 further includes a left spar 1020 and a right spar 1030, which are generally I-shaped (i.e., I-beam) structures and examples of composite structure 905 of FIG. 9B. Note that left and right spar 1020, 1030 include flanges that are generally bowed (i.e., non-planar) to match a non-planar curvature of top and bottom skins, 1010, 1015, respectively. Bends in spars 1020, 1030, may substantially deviate from ninety-degree angles to match curvature of top and bottom skins 1010, 1015, as in FIG. 10.

Left and right spars 1020, 1030 span the wing height, providing structural support between top skin 1010 and bottom skin 1015 along the wing width. Left spar 1020 includes a first laminate template 1021 and a second laminate template 1022. Similarly, right spar 1030 includes a third laminate template 1033 and a fourth laminate template 1034. First, second, third, and fourth laminate templates 1021, 1022, 1033, 1034 are generally "C-shaped", similar to first and second laminate templates 911, 912 of FIG. 9B. Each spar may be formed from two prepreg layups, each secured to a respective laminate template, as described above for composite structure 905 of FIG. 9B. Wing section 1000 may include only one spar, or more than two spars, without departing from the scope hereof.

Wing section 1000 further includes a plurality of stringers that provide structure for attaching top and bottom skins 1010, 1015 along the length of the wing. FIGS. 10 and 11 illustrate an exemplary top stringer 1040 and an exemplary bottom stringer 1050. Additional stringers may be present but unlabeled for clarity of illustration, as depicted in FIGS. 10 and 11. Top and bottom stringers 1040, 1050 are generally T-shaped structures and examples of composite structure 900 of FIG. 9A. Note that top and bottom stringers 1040, 1050 include flanges that are bowed (i.e., non-planar) to match the curvature of top and bottom skins, 1010, 1015, respectively. Top stringer 1040 includes a fifth laminate template 1045 and a sixth laminate template 1046. Similarly, bottom stringer 1050 includes a seventh laminate template 1057 and an eight laminate template 1058. Each stringer may be formed from two prepreg layups, each secured to a respective laminate template, as described above for composite structure 900 of FIG. 9A. For example, a fifth prepreg layup is secured to fifth laminate template 1045 (in operation 806, for example), and a sixth prepreg layup is secured to sixth laminate template 1046 (in operation 816, for example).

Wing section 1000 also includes a rib 1060 to provide structural support that spans between left spar 1020 and right spar 1030 across the wing-width and between top stringer 1040 and bottom stringer 1050 in the wing-height direction. The wing may include more than one rib without departing from the scope hereof.

Wing section 1000 is an example of a complex structure made of composite materials fabricated using method 800 of FIG. 8 to produce a monolithic structure lacking bonded joints. Wing section 1000 may include a plurality of integrated laminate templates, for example, first, second, third, fourth, fifth, sixth, seventh, and eight laminate templates 1021, 1022, 1033, 1034, 1045, 1046, 1057, 1058 depicted in FIGS. 10 and 11. Using laminate templates to form wing section 1000 avoids the need to bond composite components together and replaces tooling and fasteners. Advantages, as described above, include avoiding the use of adhesive bonds and providing structural support while arranging prepreg layups. This translates to reduced assembly time and labor for quicker and more cost effective manufacture. Use of laminate templates also dramatically reduces the use of metal fasteners needed for additional support. This is an important advantage for aircraft wings because metal fasteners provide a path for lightning that may increase damage in the event of a lightning strike.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all operations listed in the various figures need be carried out in the specific order described.

We claim:

1. A method to fabricate a composite structure, comprising:
   providing a laminate template including a first template surface having a bend;
   providing a first prepreg layup including a first side and a second side opposing the first side;
   securing at least a portion of the first side of the first prepreg layup to the first template surface including the bend to form a laminate template-prepreg, wherein the portion of the first prepreg layup secured to the laminate template substantially adopts the shape of the first template surface;
   providing a tool having a second template surface;
   providing a second prepreg layup including a first side and a second side opposing the first side;
   placing at least a portion of the first side of the second prepreg layup in contact with the second template surface of the tool such that the second prepreg layup substantially adopts the shape of the second template surface of the tool;
   positioning the laminate template-prepreg with respect to the second prepreg layup such that at least a portion of the second side of the first prepreg layup contacts the second side of the second prepreg layup, wherein the portion of the first prepreg layup including the bend is offset from the second prepreg layup to define a cavity between the first prepreg layup and the second prepreg layup; and
   co-curing the laminate template-prepreg and the second prepreg layup together after said positioning of the laminate template-prepreg to form a composite structure.

2. The method of claim 1, wherein the bend of the laminate template possesses an internal radius of curvature less than 0.25 inch.

3. The method of claim 1, wherein the thickness of the laminate template is about one third of the laminate template-prepreg thickness.

4. The method of claim 1, wherein securing the first side of the first prepreg layup to the first surface of the laminate template further comprises partially curing the first prepreg layup with the laminate template.

5. The method of claim 1, wherein the portion of the second side of the first prepreg layup contacting the second prepreg layup does not include the bend.

6. The method of claim 1, further comprising co-curing together the laminate template-prepreg with the second prepreg layup, while the second prepreg layup remains in contact with the tool, wherein at least a portion of the cavity is retained within the resulting composite structure.

7. The method of claim 1, wherein the first surface of the laminate template includes at least two bends.

8. The method of claim 1, wherein the second template surface of the tool includes one or more bends.

9. The method of claim 1, wherein providing the laminate template includes forming the laminate template, comprising:
   providing a template-forming tool with a third template surface having the bend;
   providing a third prepreg layup having a first side and a second side opposing the first side;
   placing the first side of the third prepreg layup in contact with the first surface of the template-forming tool, wherein the third prepreg layup substantially adopts the shape of the third template surface including the bend;
   curing the third prepreg layup while contacting the template-forming tool to form the laminate template; and
   removing the cured laminate template from the template-forming tool.

10. The method of claim 9, further comprising:
    imparting a roughness to a first surface of the laminate template to form the first template surface of the laminate template.

* * * * *